Dec. 25, 1951     H. DVORKIN     2,579,806
PROJECTING SPEED INDICATOR
Filed June 7, 1949
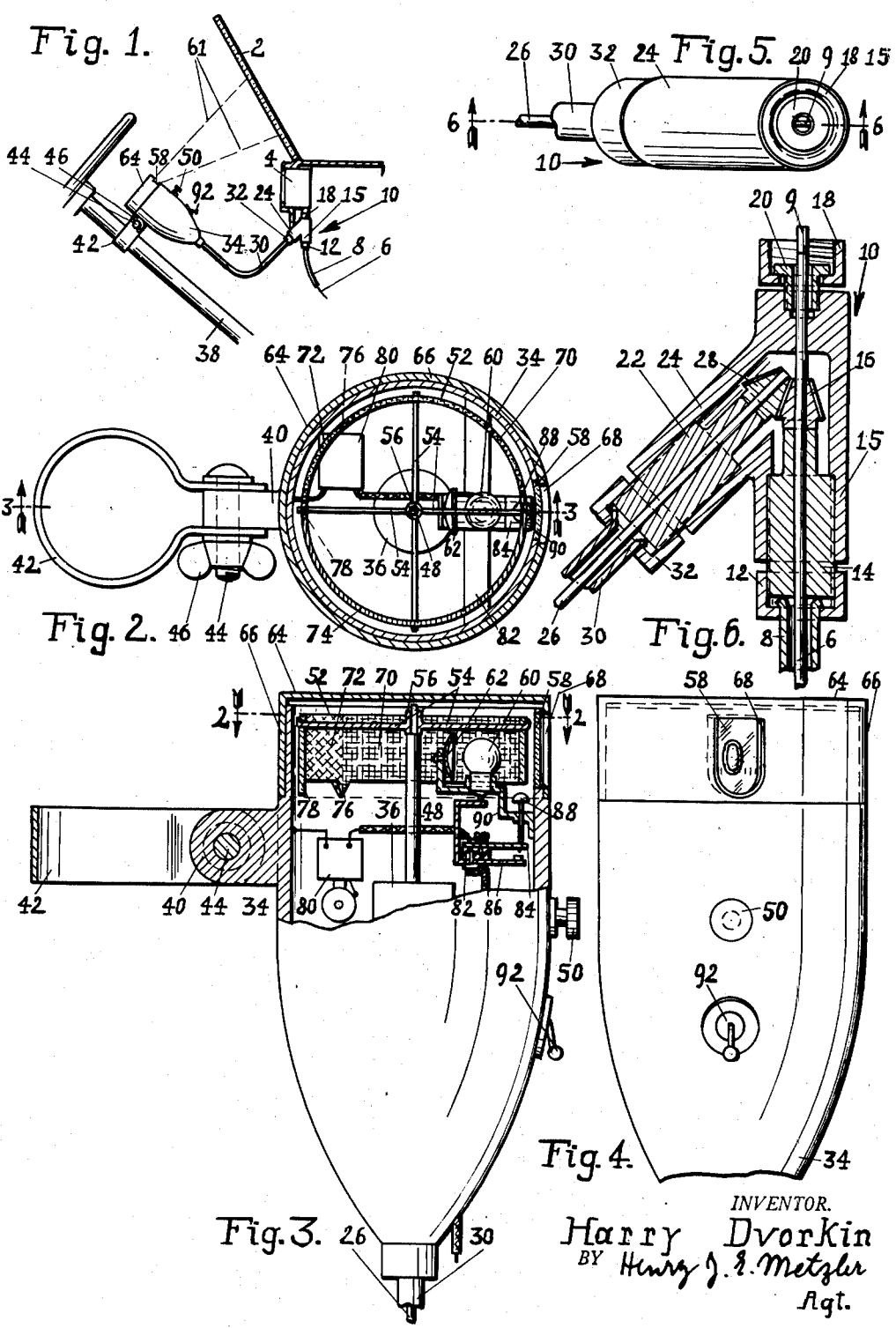
INVENTOR.
Harry Dvorkin
BY Henry J. E. Metzler
Agt.

Patented Dec. 25, 1951

2,579,806

UNITED STATES PATENT OFFICE 2,579,806

PROJECTING SPEED INDICATOR

Harry Dvorkin, Brooklyn, N. Y.

Application June 7, 1949, Serial No. 97,678

4 Claims. (Cl. 88—24)

The present invention relates to improvements in apparatus for correlating spaced and separate points of observation utilized in the control of a moving object, to the end that such control may be made more efficient with a diminution in fatigue in the eye of the observer, particularly at night. More specifically, the present invention relates to an improvement over the device disclosed by the Patent No. 1,871,877, dated August 16, 1932.

Instruments indicating the speed of an automobile or of any other vehicle, as well as oil gauges, ammeters, or the like have heretofore been disposed at a point or region accessible to the eye of the operator, but outside of the normal field of operating vision. While accessible, the reading of these instruments necessitates the removal of the eye of the observer or operator from the path of travel, and, while such lapse of concentration upon the road is not necessarily serious in all cases, it is well known that it introduces a factor of danger, which becomes more serious with the increase in speed under present travel conditions. When driving at night many drivers prefer to switch off the dashboard light or to turn it low, and it is not a good safety factor to have to glance at intervals at the dashboard to check the speed or other conditions of the vehicle. The safety factor will still be reduced if the operator has to turn the dashboard light on or has to make it brighter each time he wants to find out how fast he is going. It is not only the temporary distraction from the road at night which is highly objectionable but also the difference in illumination between road and instrument is found to be annoying or even painful to the eyes of many operators; this highly increases the danger of driving at night, particularly since at night one is less aware of the actual speed than during day time, and it is usual that an operator is induced to check his speed only if he believes that it might be excessive.

Therefore one object of the present invention is the provision of a device of the character described which projects upon the windshield or upon any other suitable object in the field of normal vision of the operator of a vehicle an image of symbols indicating the speed or any other facts which ordinarily can be ascertained only by shifting one's eyes from the field of vision forwardly of the moving vehicle to the dashboard or to the place at which the speedometer or the like is located.

Another object of the present invention is the provision of a device of the character described which automatically changes the color of the image on the windshield or the like whenever certain speed ranges have been reached.

Still another object of the present invention is the provision of a device of the character described which automatically indicates, by means of an acoustic signal, the change from one speed range to another.

A further object of the present invention is the provision of a device of the character described which does not require any open mirrors or open lights which would blind the operator or unduly interfere with his vision at night.

Yet a still further object of the present invention is the provision of a device of the character described which is comparatively simple, inexpensive, small in size, light in weight, but which also is durable, reliable in operation, and adjustable to the individual operator's convenience, and which can be installed easily and quickly.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawings the preferred forms of the invention have been shown.

In said drawings:

Figure 1 is a side view of preferred embodiment of my invention as it appears on an automobile;

Fig. 2 is a cross-sectional view of the indicator on the line 2—2 of Fig. 3;

Fig. 3 is a fractional longitudinal sectional view on the line 3—3 of Fig. 2 and a fractional elevation of the indicator;

Fig. 4 is a front view of the indicator;

Fig. 5 is a top view of the driving mechanism; and

Fig. 6 is a sectional view on the line 6—6 of Fig. 5.

Similar reference characters refer to similar parts throughout the several views.

In the following description and in the drawing there is explained a speed indicator for an automobile in accordance with the present invention, but it will be obvious that the present invention can be used also with minor changes for other instruments, such as thermometers, ammeters, oil gauges, and the like for any vehicle or device for land, water or air transportation.

In the drawing the numeral 2 denotes a windshield of an automobile, which is mounted in the usual manner above the dash-board that contains a speedometer 4. The latter is driven by a flexible shaft 6 which is extended through a tubing 8, and which has a flattened upper end portion 9 (Figs. 5 and 6) adapted for being in driving engagement with a rotatable part of the speedometer 4. The tubing 8 is attached to a tubular branched member 10 by means of a screw cap 12 that is secured upon an externally threaded bearing plug 14. The latter is screwed into the internally threaded branch of the member 10, and the shaft 6 is extended therethrough. A bevel gear wheel 16 within the member 10 is secured to the shaft 6, and the member 10 is secured to the speedometer 4 by means of a screw cap 18 and a screw 20 that engages an internally threaded bore in the upper portion of the member 10. Another externally threaded bearing plug 22 is screwed into the internally threaded branch 24 of the member 10, and a flexible shaft 26 is extended through the plug 22 and has secured to its extremity within the housing member 10 a bevel gear wheel 28 which is in engagement with the wheel 16. A tube 30, through which extends the shaft 26, is secured to the member 10 by means of a screw cap 32 that is screwed upon the plug 22.

A housing 34, which contains any suitable tachometer mechanism 36 of well-known construction is secured to the stationary tubular steering shaft envelope 38 by any suitable, preferably adjustable means. The housing 34, instead of being secured to the steering column, can be attached also to any other suitable stationary part of the vehicle. In the instance shown, the housing 34 is provided with a lug 40 to which is attached a clamp member 42 by means of a screw 44, which extends through the lug 40 as well as through the end portions of the clamp member 42. After loosening a thumb nut 46, the housing 34 can be angularly adjusted relative to the part 38, and after adjustment it can be fixed and retained in adjusted position by tightening the nut 46. Instead of the parts 44 and 46 there could be used also a ball socket or the like for adjustably connecting the housing 34 to the part 38.

The shaft 26 is extended into the housing 34 and drives the tachometer mechanism 36. The latter causes rotation of a shaft 48 and either is adjusted or can be adjusted by means of a knob 50, which is at the outer side of the housing 34, in such a manner that the shaft 48 will carry out exactly the same angular movements as the pointer or hand shaft of the speedometer 4.

The shaft 48 carries a transparent member on which are symbols, that are identical to the symbols on the speedometer, for indicating the speed. While said transparent member may be a transparent disk, a cylinder, a polygonal plate or the like, in the present instance it is a transparent ring 52 which is attached to the shaft 48 by means of spokes 54 that are joined at a hub portion 56. The upper portion of the housing 34 is provided with a small window 58 and a source of light, for instance an electric light bulb 60, is placed within the ring 52 in alignment with the window 58, so that by illuminating the bulb 60 there can be projected through the window 58 a portion of the transparent ring 52 and of the symbols thereon upon the windshield 2, as is indicated by the dotted lines 61 in Fig. 1. The symbols on the ring 52, which normally are nu-merals and graduation marks, may be in the form of perforations or they may be made opaque or of a color which differs from the color of the ring 52. In accordance with the usual speedometer dials, the ring 52 ordinarily is provided with numerals indicating the speed from zero to one hundred miles per hour, so that an enlarged image of the numerals indicating the speed will be projected on the windshield 2. This image itself will be transparent and will be in the normal field of vision of the operator. Thus the operator always has the speed indicated before his eyes and will not have to shift his view from the road to the speedometer 4, while driving at night. He may switch off the dashboard light which normally illuminates the speedometer 4. In order to intensify the illumination of the bulb 60, I prefer to place a reflector 62 in juxtaposition to the bulb 60, and the window 58 can be provided with a lens instead of a small pane.

The top of the housing 34 is closed by a removable cover 64, so that its interior is accessible for repairing, lubricating or cleaning purposes. I prefer to provide the cover 64 with a rim 66 which overlaps the upper portion of the housing 34 and which has an opening 68 that normally registers with the window 58. This arrangement allows an adjustment of the effective width of said window by turning the cover 64 relative to the housing 34. If the opening 68 is in registering alignment with the window 58, the light passes through the entire width of the window; but if the cover 64 is turned to a position in which a portion of the window 58 is covered by the rim 66, there will remain only a narrow slot through which the light can escape. Thus by simply turning the cover, the operator can adjust the width of the image which is projected upon the windshield 2 or upon any other suitable surface.

In order to warn the operator of a change in speed ranges I prefer to make different sections of the ring 52 of different colors so that the color of said image will change with a speed range change, and to provide an acoustical signal which will emit a sound whenever the speed changes from one range to another. I prefer to carry out these features of my invention in the manner shown in the drawing, where it will be seen that, according to the color indications in Figs. 2 and 3, a section 70 of the ring 52 is yellow, the next section 72 is orange, and the rest, section 74 (Fig. 2), is red. Cam portions 76 and 78 extend from the ring 52 at those lower edge portions which are at the juncture of the sections 70 and 72, and 72 and 74 respectively. The section 70 can be provided, for instance, with symbols indicating a speed up to 35 miles per hour, the symbols on the section 72 may be provided with symbols indicating speed, from 35 to 50 miles per hour, and the section 74 can be provided with symbols indicating a speed from 50 to 100 miles per hour. Adjacent the window 58, in which appears the numeral zero when the vehicle is not in motion, there is any suitable contact mechanism which will close a circuit for an acoustic signal 80 whenever one of the cam portions 76 or 78 touches a movable part or contact member in the way of said cam portions. In the present instance there is transversely extended through and attached to the housing 34 an insulating bar 82, to which are attached resilient contact fingers 84 and 86. An insulating plunger member 88 is vertically shiftably extended through a conductive member 90, which carries the bulb 60 and the reflector 62. The member 88 rests upon the contact finger 84, which is in spaced relation to the finger 86. When the member 88 is depressed by one of the cam portions 76 or 78, one end of the finger 84 touches the finger 86, so that an electrical circuit will be closed and the signal 80 will be actuated. The signal 80 may be a chime, or a buzzer or the like, and it may be within or outside of the housing 34. A switch 92 preferably is provided on the housing 34 for disconnecting the electrical parts therein from the source of current during day time or when the device is not in use.

Instead of the mechanical drive consisting of the parts 10 to 30, there can be provided an electrical drive, either by synchronizing a motor in the housing 34 with a dynamo driven by the shaft 6, or by arranging in the speedometer 4 a series of contacts for energizing a series of magnetos in the housing 34 which cause an angular movement of the shaft 48 or of said transparent member. Or, in the case of installation of this device into new automobiles, the speedometer itself can be provided with a rotating transparent member and a projecting device and can be arranged in such a manner that an image will be thrown directly from the speedometer upon the windshield or upon any other suitable surface.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent is:

1. A device for projecting an image of an indication of the functioning of a moving vehicle into the field of normal operating vision for an operator upon the vehicle, comprising an indicator, a transparent movable member with index symbols thereon being driven by said indicator and having cam portions on one of its edges, contact means for closing an electric acoustic alarm circuit being adjacent that edge of said transparent member which is provided with said cam portions and being adapted for closing the circuit whenever one of said cam portions touches said contact means, and a source of light in juxtaposition with said transparent member adapted for projecting an image of a portion of said index symbols upon an object in the field of vision, said cam portions being in alignment with groups of said index symbols on said transparent movable member so as to cause the sounding of the alarm for indicating a change in groups of symbols exposed to said source of light.

2. A device for projecting a speedometer reading into the field of vision forwardly of a moving vehicle, which vehicle is provided with a speedometer and means for driving said speedometer; said device comprising a closed housing having a window and being angularly adjustable on a stationary part of the vehicle, a tachometer mechanism within said housing, a flexible shaft in driving engagement with said tachometer mechanism being connected by a set of gears to the driving means of said speedometer, a rotatable transparent member within said housing being driven by said tachometer mechanism and having cam portions on one of its edges, means for closing an electric circuit being adjacent that edge of said transparent member which is provided with said cam portions and being adapted for closing the circuit whenever one of said cam portions touches said contact means, an electrical acoustic signal device within said electrical circuit being adapted to be actuated whenever said circuit is closed, and a source of light within said housing in juxtaposition to said rotatable transparent member being adapted for throwing light through the transparent member and the window of said housing upon the windshield of the vehicle, index symbols identical with the numerals on the dial of the speedometer being provided on said rotatable transparent member, and the latter having sections of different colors.

3. A device for projecting a speedometer reading upon the windshield of a vehicle which is provided with a speedometer; said device comprising a transparent movable member having speedometer index symbols thereon and being provided with means for closing an electric circuit at the completion of portions of the movement of the transparent movable member, a tachometer mechanism driving said transparent movable member, means for driving said tachometer being connected to the means for driving the speedometer of the vehicle, an electrical acoustic signal device within said electric circuit adapted to be actuated whenever said circuit is closed, and a source of light juxtaposed to said transparent movable member being adapted for throwing light through said transparent movable member, upon the windshield of the vehicle.

4. A device for projecting a speedometer reading into the field of vision forwardly of a moving vehicle, which vehicle is provided with a speedometer; said device comprising a transparent movable member having speedometer index symbols thereon and being driven by a tachometer mechanism, which is turned by a flexible cable having motion transferring means attached to either end of the flexible cable that drives the dashboard speedometer, an acoustic signal in cooperative engagement with said moving transparent member and adapted for emitting sounds whenever said transparent member is in a predetermined position, and a source of light in juxtaposition with said transparent member adapted for projecting an image of a portion of said index symbols upon an object in the field of vision.

HARRY DVORKIN.

REFERENCES CITED

The following references are of record in the file of this patent:

UNITED STATES PATENTS

| Number | Name | Date |
|---|---|---|
| 1,619,096 | Walsh | Mar. 1, 1927 |
| 2,160,202 | Fieux | May 30, 1939 |
| 2,191,045 | Slayton | Feb. 20, 1940 |
| 2,264,044 | Lee | Nov. 25, 1941 |
| 2,382,631 | Harasta | Aug. 14, 1945 |

FOREIGN PATENTS

| Number | Country | Date |
|---|---|---|
| 859,823 | France | Sept. 16, 1940 |